United States Patent [19]
Clinton et al.

[11] 3,903,312
[45] Sept. 2, 1975

[54] PROCESS FOR PRODUCING AROMATIZED FREEZE DRIED COFFEE

[75] Inventors: William P. Clinton, Mansey, N.Y.; Joe W. Johnson, Stanford, Conn.; Franklyn W. Meyer, Bedford, N.Y.; Richard A. Pfluger, Maplewood, N.Y.; Gerald E. Jacobs, Brooklyn, N.Y.

[73] Assignee: General Foods Corporation, White Plains, N.Y.

[22] Filed: Oct. 2, 1972

[21] Appl. No.: 294,115

Related U.S. Application Data

[60] Continuation of Ser. No. 33,899, May 1, 1970, abandoned, which is a division of Ser. No. 830,195, May 20, 1969, which is a continuation of Ser. No. 453,459, May 5, 1965, abandoned.

[52] U.S. Cl.................................. 426/594; 426/385
[51] Int. Cl.² ............................................ A23F 1/00
[58] Field of Search .......... 426/385, 386, 461, 444, 426/193, 148, 432, 511, 471, 384; 62/58; 32/5

[56] References Cited
UNITED STATES PATENTS

| | | | |
|---|---|---|---|
| 2,292,447 | 8/1942 | Irwin | 62/58 |
| 2,509,681 | 5/1950 | Flosdorf | 62/58 |
| 2,751,687 | 6/1956 | Colton | 99/71 |
| 3,132,947 | 5/1964 | Mahlmann | 426/386 |
| 3,244,529 | 4/1966 | Johnson et al. | 99/199 |
| 3,253,420 | 5/1966 | De George | 99/71 |
| 3,266,169 | 8/1966 | Smith | 99/71 |
| 3,269,025 | 8/1966 | Drysden et al. | 99/71 |
| 3,362,835 | 1/1968 | Thnse et al. | 99/199 |
| 3,443,961 | 5/1969 | Kaleda et al. | 99/71 |
| 3,486,907 | 12/1969 | Huir et al. | 99/71 |

Primary Examiner—Samih N. Zaharna
Assistant Examiner—Ernest G. Therkorn
Attorney, Agent, or Firm—Bruno P. Struzzi; Michael J. Quillinan

[57] ABSTRACT

Coffee extract is frozen and the frozen extract is vacuum freeze dried at a chamber pressure at from 200 to 500 microns and a maximum condenser temperature of −30°F.

3 Claims, 1 Drawing Figure

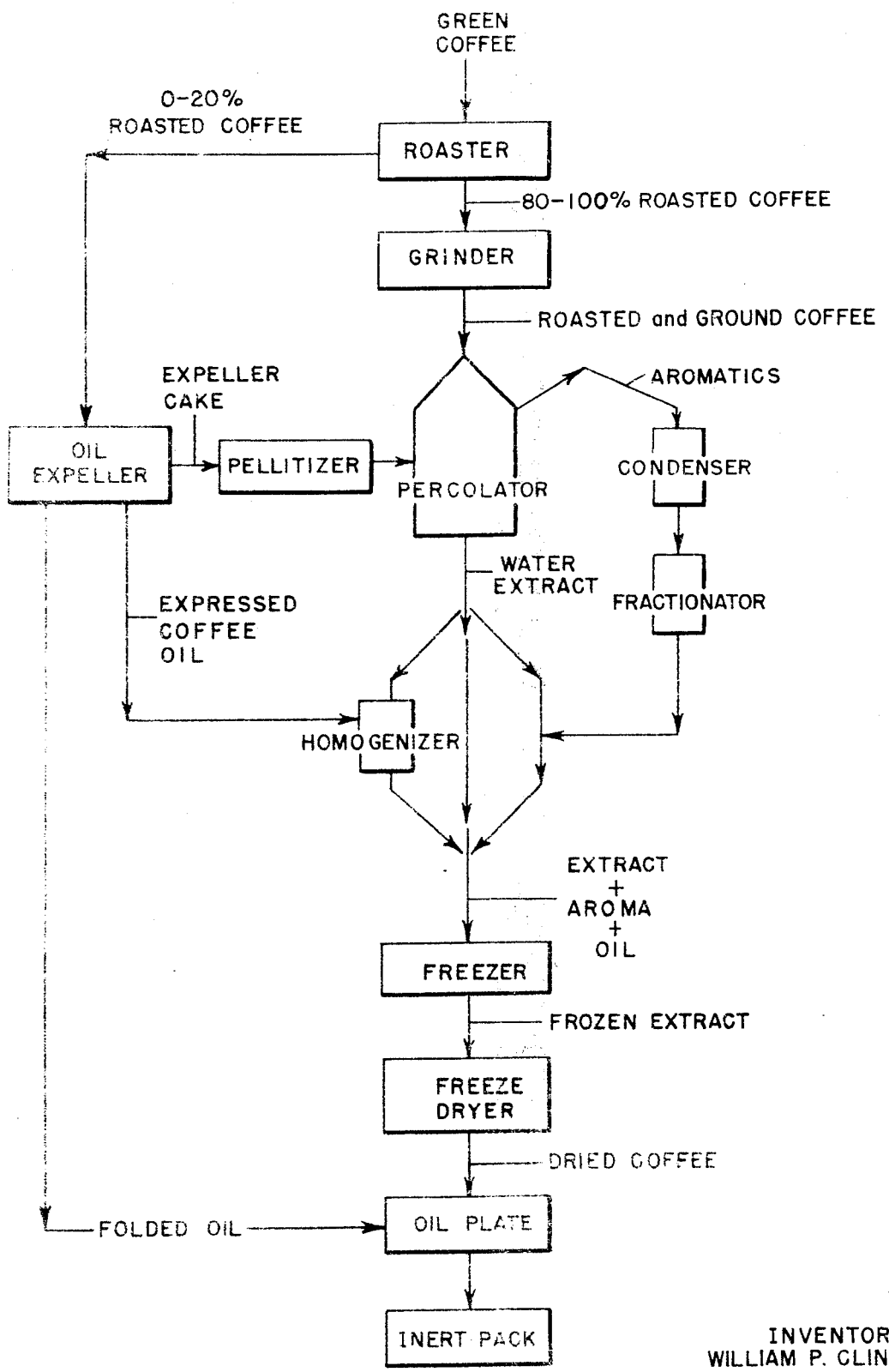

PROCESS FOR PRODUCING AROMATIZED FREEZE DRIED COFFEE

CROSS REFERENCE TO RELATED APPLICATIONS

This application is a continuation of application Ser. No. 33,899 filed May 1, 1970 for PROCESS FOR PRODUCING AROMATIZED FREEZEDRIED COFFEE (now abandoned), which latter application is a division of pending application Ser. No. 830,195 filed May 20, 1969 which in turn is a streamlined continuation of abandoned application Ser. No. 453,459 filed May 5, 1965 now abandoned.

This invention relates to freeze drying coffee and, more particularly, to a process for producing an economical freeze-dried coffee of improved aroma and taste having a desirable dark color.

The prior art contains various disclosures relative to producing freeze-dried coffee. However, the freeze-dried coffee of the prior art has had several disadvantages. If the product was stable on storage, it usually was unaromatized and had an aroma and taste almost indistinguishable from ordinary spray-dried soluble coffee. In the case where the freeze-dried product was aromatized and had an initial improvement in aroma and taste over ordinary soluble coffee, it was found to deteriorate rapidly upon storage to form compounds which gave an undesirable taste and aroma to the soluble coffee. Also, freeze-dried coffee usually had an undesirable light color which gave the product an undesirable appearance. This resulted in a soluble coffee which was considered inferior to ordinary soluble coffee. Moreover, all the prior art products were very expensive to produce and no method was devised which could compete economically with spray-dried coffee.

It would, therefore, be desirable if a process could be devised which could efficiently produce a stable, aromatized, freeze-dried coffee of improved color, aroma and taste.

It has now been found that a stable freeze-dried soluble coffee can be produced by extracting roasted and ground coffee in a manner which retains at least some of the stable and unstable volatile aromas present in said coffee, freezing said extract, and then freeze drying the frozen extract at a pressure of below 500 microns and a condenser temperature of below −30°F, said freeze drying being performed for at least 4 hours at a pressure of below 200 microns and a condenser temperature of below −55°F to remove at least a portion of the unstable volatile aromatics present in the extract.

Preferably, freeze drying is accomplished after the non-volatile coffee oils are either expressed or solvent extracted from a portion of the coffee charge according to known techniques. The coffee oil may be clarified, filtered and then homogenized in a small portion (say 20%) of the extract stream before it is added to the coffee. If desired, the coffee oil which is expressed from the roasted coffee may be used in the crude form (without clarifying or filtering) with the "fines" present since these fines contain valuable aromatic material.

Also, the coffee extract prior to freeze drying may be frozen slowly over a period of at least 15 minutes from its ice point to below its eutectic point in order to secure a dark-colored final product. "Ice point" is that point at which ice crystals first begin to form in the liquid extract while the "eutectic point" is the lowest possible melting point of the coffee extract.

However, most preferably, it has now been discovered that a stable, aromatized, freeze-dried coffee may be produced by process which involves removing coffee oil and volatile aromas from freshly roasted coffee, extracting the dearomatized coffee to obtain an aqueous extract of coffee solids, mixing 0.2 to 2% of said coffee oil by weight of soluble solids in the extract with said extract, homogenizing said mixture of oil and extract, adding 0.5 to 5% of said volatile aromas to said extract, freezing said aromatized extract and then freeze drying said extract under conditions which remove at least a portion of the unstable aromatic compounds added to said coffee.

It is a feature of this preferred process that the volatile aromatic compounds separated from the freshly roasted coffee and added to the extract stream after the coffee oil (which may be expressed oil or solvent extracted oil) is homogenized with a portion of the extract stream at pressures of above 1000 p.s.i.g. Homogenization is a necessary step in order to secure a suitable dispersion of the coffee oil in the extract. However, if the volatile aromas separated from the coffee by vacuum distillation or steam distillation are added to the extract prior to the homogenization step, the homogenization step is found to degrade the aroma fraction.

It is still another feature of this invention that the coffee extract be frozen in a manner which develops discrete ice crystals which grow larger and eventually form a dendritic type of ice lattice having concentrated extract between the ice walls. The preferred freezing operation thus provides thicker walls of frozen coffee extract which, upon subsequent drying, will give a dark coffee-like color to the freeze-dried coffee. In order to develop these large ice crystals, the extract is cooled slowly between 25°F and 10°F over a period of at least 10 minutes. Prior to completely freezing the extract, it may be subjected to a freeze-concentration operation wherein coffee extract is slowly cooled to below its ice point to develop 5 to 50% ice crystals of the total water present, a substantial number of these ice crystals removed, the coffee extract then further concentrated to thereby freeze an additional 5 to 30% of the water content, and a substantial number of these ice crystals removed. The concentrated coffee extract which now has about 30–60% of its water content removed and a solids concentration of between 35 and 55%, is cooled to below 10°F over a period of at least 10 minutes and then frozen to below its eutectic point. If desired, the coffee extract may be subjected to repeated steps of freeze concentration until concentrated to a point where at least 90% of the free water content (about 60–70% of the total water content) is removed from the extract. Then, the concentrated extract need not be slowly frozen in order to develop a dark colored final product. The highly concentrated extract having substantially all of its water removed may then be rapidly frozen by freezing methods such as liquid nitrogen, liquid carbon dioxide or Freon and then freeze-dried. However, it is understood that regardless of the manner of freezing employed, it is essential that at least the initial portion of the freezing step be slowly performed in order to develop ice crystals which act as a crystallization nucleus for the later formed ice crystals.

In freeze drying the frozen extract, it is not necessary to operate at a vacuum of below 200 microns during the entire drying stage, but it is necessary that such vacuum be maintained for at least 4 hours in order to remove some of the unstable compounds added to the coffee in the form of steam distilled aromas. This is accomplished by using a freeze dryer having a condenser which operates at a temperature of −30°F or below for a major portion of the drying operation and a condenser temperature of below −55°F for that portion where a pressure of below 200 microns is desired. During drying, product temperatures of above 120°F and preferably above 108°F should be avoided.

It is necessary to dry the coffee extract to a stable moisture level of between 1 and 2.5%. Above this moisture range, it has been found that the soluble coffee product cakes and develops off-flavors upon storage. However, care should be taken not to dry the extract to a level of below 1% moisture since over-drying will cause an excess removal of aromatic materials including those which are essential to a good coffee flavor.

After the extract has been dried, atmospheric oxygen and moisture exposure should be kept at a minimum during further processing and packaging in order to assure an in-package moisture level of less than 2.5% and an oxygen level of less than 1%, preferably less than 0.5%. In accomplishing this, it is necessary to "break" the vacuum in the freeze drying chamber by the use of a dry inert gas, such as nitrogen, which serves to permeate the product. Further processing and packing of the product should be done in dry inert gas conditions. Carbon dioxide, nitrogen, argon or other inert gas can be used for this purpose. When the product is to be exposed to ambient moisture and oxygen, it must then be dried to below 2.5% moisture, say 1.7% moisture where moisture pick-up will be about 0.8%.

Referring to a schematic drawing of the preferred process of this invention, it is seen that a blend of green coffee beans are roasted in a conventional manner. The roasted whole beans are then separated into a major portion (about 80–100% by weight) and a minor portion (about 0–20% by weight). The minor portion of roasted coffee has its oil expressed from the whole beans, the coffee oil may then be filtered or clarified prior to homogenization of about one-fourth of this oil with a minor portion of the subsequent dearomatized extract stream. The expeller cake obtained from this treatment may be pelletized and added to the roasted coffee prior to steaming. The other three-fourths portion of expressed oil is further refined by distilling aromatics from the oil (by use of a molecular still according to the procedure of Feldman et al. U.S. Pat. No. 2,947,634) and then adding these aromatics back to distilled expressed oil at about a 5–10 fold level. This gives a folded oil which can be used to plate the freeze-dried coffee particles prior to packaging.

The major portion of roasted coffee is in the meantime ground to a particle size which will permit a suitable reflux and rectification of the coffee during the volatile steam distillation treatment, i.e., at least 90% by weight retained on a 40 mesh (U.S. Standard Sieve Screen). Coffee pellets obtained from the expeller cake are added to the roasted and ground coffee charge and the coffee is placed in a percolator column, preferably having a length at least 5 times its width, and the coffee is then subjected to atmospheric steaming for at least 20–30 minutes in order to obtain a volatile flavor fraction which is condensable at between 35° to 70°F. This procedure is described in the patent to Mahlmann U.S. Pat. No. 3,132,947. The vapors may be fractionated, if desired, in order to remove organic acids and water from the volatiles and thereby obtain a purer fraction of volatile aromas.

The elongated bed of coffee is then water extracted to obtain a dilute extract of coffee solids (20–35%). About 5–20% of the extract stream is then separated from the main extract stream and is used to homogenize the coffee oil to be added to the extract while the main stream of coffee extract is mixed with the volatile aromatics obtained by atmospheric steaming of the coffee.

The extract stream from the percolator may be subjected to freeze-concentration prior to adding the homogenized oil and aroma fraction. If concentration is to proceed to a point which has removed a substantial amount of the free water present, then minor portions of extract containing the homogenized oil and aroma must be added back to the main extract stream at some point in the latter stages of freeze-concentration. Extract concentrated to above 60% soluble solids may then be rapidly frozen and freeze-dried while still obtaining a dark-colored product.

After aromatization of the extract, the extract must be frozen to below its eutectic point. Freezing is preferably accomplished slowly over a period of at least 15 minutes (when granulating prior to freeze-drying and at least 30 minutes when granulated after drying) in order to preserve a dark color in the final coffee. The frozen extract, when cooled to below its eutectic point, is then either granulated to a particle size wherein at least 90% of the particles are greater than 40 mesh (U.S. Standard Sieve), or placed in the form of slabs (0.7 inch thick or less), in freeze dryers which reduce the moisture content of the coffee to a stable level. The dried extract is then ground, if necessary, and plated with the folded oil obtained from the oil expelling operation. The plated particles of coffee are then packaged under inert conditions which keep contact with atmospheric moisture and oxygen to a minimum.

This invention will now be described by reference to the following examples:

EXAMPLE 1

About 600 lbs. of blended green coffee beans were subjected to a conventional roast at between 400° to 440°F for about 15–20 minutes to yield 530 lbs. of roasted coffee. The roasted beans were then separated into a major portion (480 lbs.) and a minor portion (50 lbs.).

The minor portion (50 lbs.) of whole roasted coffee was introduced into a commercial oil expeller and expressed at 10,000 p.s.i.g. in a screw press wherein the screw had flights traveling within a complementary perforated cage or screen concurrent to the feed of coffee. About 4 lbs. of crude oil was obtained, which was then clarified by passing it through a commercial pressure filter to give 3.3 lbs. of clarified oil. The oil expression and clarification was carried out in a carbon dioxide atmosphere to prevent oil degradation. The clarified oil was then stored at 10°F under carbon dioxide until ready for use. The expeller cake resulting from the expression of the coffee was then pelletized by extruding it through ⅜ inch die holes and cutting it into pellet lengths in the order of ⅜ to ½ inch.

The major portion of roasted coffee (480 lbs.) was then ground to a particle size distribution wherein 90% by weight of the particles were retained on a 20 mesh U.S. Standard Screen. The pellets were added to the ground coffee and the mixture was introduced into a conventional commercial coffee extractor approximately 20 inches in diameter and 20 feet high to give a total coffee charge of about 500 lbs. Steam at a pressure of 5–10 p.s.i.g. was introduced into the bottom of the percolator and permitted to pass through the column of coffee to wet the coffee and distill volatile aromatics. The steam was allowed to pass through the column for a period of at least 25 minutes. Then, vapors from the top of the column were allowed to pass through a fractionator column (packed with ½ inch glass rings) 8 feet tall and 6 inches in diameter. The vapors, coming off at above 180°F, about 200°–230°F, were condensed in a brine condenser at 35° F under a nitrogen atmosphere. About 1,100 ml. of the steam distillate was collected as a liquid condensate. The steam distillate collected in this manner was then held at 35°F until it was used.

The steamed coffee was extracted with water under conventional coffee percolation techniques used in soluble coffee production. About 200 lbs. of soluble solids were extracted and collected as a liquid extract which weighed about 500 lbs. This extract had a soluble solids concentration of about 27%. About 50 lbs. of extract was removed from the main extract stream. About one-fourth (0.8 lbs.) of the expressed oil was warmed to 65°F and dispersed in the 50 lb. portion of extract by homogenization at 2,000 p.s.i.g. The homogenized oil was then added to the extract stream and the 1,100 ml. of steam distillate were mixed into the extract.

The aromatized extract now containing 0.4% of homogenized oil and 0.8% of steam distilled aroma was then frozen into a ½ inch thick layer of coffee extract by means of a freezing belt made of stainless steel. The belt was about 75 feet long, 30 inches wide, and was operated by two terminal pulleys which allowed the liquid extract about 60 minutes to be transported from one end of the belt to the other. Side skirts or retaining walls were used to keep the liquid extract on the belt as it was frozen. The belt was cooled by contact with three brine tanks, the first having a temperature of about 20°F for the initial one-third portion of the belt, the second having a temperature of 5°F, and the third about −10°F for the final one-third portion of the belt. In order to facilitate release of the frozen extract at the terminal portions of the belt, a water film (about 0.5 inch thick) was sprayed onto the initial portion of the belt and frozen to said belt. Then, liquid extract having a temperature just above the ice point (31°F) was applied to the freezing belt and cooled to below its eutectic point of −13.5°F. in about 40 minutes by passing the extract over the brine tanks. The frozen extract issued from the terminal portion of the freezing belt at a product temperature of about −20°F. The frozen extract was removed from the belt by breaking off frozen slabs about 20 inches long. This gave individual slabs having a dimension of about ½ × 20 × 30 inches.

The slabs of frozen coffee extract were then placed in a freeze dryer equipped with horizontal shelves and an internal condenser. The frozen extract was heated by platens spaced about 1/16 inch from the frozen extract. A vacuum of 300 microns of mercury was drawn on the chamber, a condenser temperature of −40°F was applied, and the platen temperature was raised to 120°F. The pressure was not allowed to rise above 500 microns. The condenser temperature of −40°F was maintained for about 12 hours until the moisture of the coffee was reduced to about 10%. The platen temperature was then lowered to 95°F, the condenser temperature was lowered to −60°C and the pressure reduced to below 150 microns. These conditions were maintained for about 5–6 hours until the coffee was dried to a moisture level of about 1.7%. The freeze drying chamber was released to atmosphere by injecting nitrogen into the system. The nitrogen thus penetrated into the pores or channels left by the ice sublimed from the extract. The dry slabs of coffee were then ground to a size wherein at least 90% of the particles were retained on a 40 mesh (U.S. Standard Sieve screen), and plated with the remaining portion (2.5 lbs.) of the expressed coffee oil which was concentrated to a five-fold fraction weighing 0.5 lbs. Five-fold oil is obtained by distilling the aromas from expressed oil and then adding the aroma back to one-fifth of the original oil content. The freeze-dried coffee was not exposed to ambient conditions for more than 5 minutes prior to being packed in glass jars under a carbon dioxide head space, having less than 1% oxygen.

The freeze-dried coffee, having a final in-jar moisture content of about 2.2%, was stored at 95°F for 3 months and, at the end of this time, exhibited no appreciable change in regard to flavor or flowability (caking).

EXAMPLE 2

The procedure of Example 1 was repeated with the exception that the coffee was granulated prior to freeze-drying as the frozen slabs were removed from the belt. The frozen extract was granulated to a size wherein at least 90–95% of the particles were retained on a 40 mesh screen (U.S. Standard Sieve) and no more than 5% of the particles were retained on a 6 mesh screen. In this example the cooling profile on the freezing belts was changed to 10°F, −20°F, and −40°F for the three brine tanks. Residence time of extract on the belts was lowered from 1 hour to 30 minutes. Total freeze-drying time was reduced from 17–18 hours in Example 1 to about 8 hours. The product was similar in all respects to that of Example 1.

EXAMPLE 3

The procedure of Example 1 was repeated with the exception that the coffee extract was concentrated by freeze-concentration prior to freezing the extract to below its eutectic point. The dearomatized extract, having a solids concentration of 27% was first chilled to between 33° and 45°F and held for 30–45 minutes to cause insoluble sediment to form in the extract. This was then filtered and removed by centrifugation. The extract was placed in a hold-up tank and diluted to about 20% soluble solids. Then the extract was partially frozen in a multitutube heat exchanger with agitation at a temperature of 25° to 28°F until it was concentrated to a solids content of about 35% by removing water as ice crystals. About 35% of the total water content was removed as ice crystals by centrifuging. The ice crystals were then washed to remove residual solids adhering to the ice, the wash water containing solids was recycled to the feed tank, and the ice crystals discarded. The 35% extract was then further cooled at a temperature of 20° to 24°F to further concentrate the extract. About 20% of the total water content was again removed as ice crystals and the extract was drawn off at a concentration of about 45% solids.

The concentrated extract was then combined with the volatile aroma and oil according to the procedure of Example 1 and frozen slowly on the freezing belt in about 20 minutes. The frozen product was then ground as in Example 2 and freeze-dried. The final product was similar in all respects to that of Examples 1 and 2.

While this invention has been described in regard to the production of a non-decaffeinated freeze-dried coffee, it is understood that the same process can be applied to a decaffeinated product, the extract being decaffeinated by conventional techniques prior to freeze drying.

Reference will now be made to the appended claims for a definition of the scope of this invention.

What is claimed is:

1. A process for preparing aromatized freeze-dried coffee which is stable on storage and comprises passing steam through a column of roasted and ground coffee to wet it and distill aromatics; percolating the roasted and ground coffee in a manner which retains at least some of the stable and unstable aromas present to obtain a coffee extract; concentrating the extract to a solids content between 35–55%; collecting the aromatics and adding it to the concentrate; freezing the aromatized concentrated extract by cooling it to below its eutectic point; placing the frozen coffee extract in a freeze drying chamber equipped with heating platens spaced proximate the extract and a condenser adapted to operate at −30°F or below; freeze drying the frozen extract under vacuum conditions below 500 microns while applying heat to the freeze drying platens and maintaining a condenser temperature not exceeding −30°F throughout the process; the vacuum conditions being maintained at less than 200 microns and the freeze drying condenser temperature being maintained below a a maximum of −55°F during a portion of the drying cycle after partial dehydration to 10% moisture and for a period of time sufficient to produce a stable dry product of 1 to 2.5% moisture without heating the product to a point whereat it exceeds 120°F during drying; and breaking the vacuum to an inert gas to cause it to permeate the product.

2. The process of claim 1 wherein the frozen extract is ground prior to freeze-drying.

3. The product of the process of claim 1.

* * * * *